(12) United States Patent
Kim et al.

(10) Patent No.: US 11,665,750 B2
(45) Date of Patent: *May 30, 2023

(54) METHOD FOR RECEIVING DOWNLINK SIGNAL, IN WIRELESS COMMUNICATION SYSTEM SUPPORTING UNLICENSED BAND, AND DEVICE FOR SUPPORTING SAME

(71) Applicant: LG ELECTRONICS INC., Seoul (KR)

(72) Inventors: Seonwook Kim, Seoul (KR); Joonkui Ahn, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 7 days.

This patent is subject to a terminal disclaimer.

(21) Appl. No.: 16/825,770

(22) Filed: Mar. 20, 2020

(65) Prior Publication Data

US 2020/0221496 A1 Jul. 9, 2020

Related U.S. Application Data

(63) Continuation of application No. 16/071,744, filed as application No. PCT/KR2017/000960 on Jan. 26, 2017, now Pat. No. 10,638,519.

(Continued)

(51) Int. Cl.
*H04W 74/08* (2009.01)
*H04W 72/14* (2009.01)
(Continued)

(52) U.S. Cl.
CPC ......... *H04W 74/085* (2013.01); *H04L 5/0044* (2013.01); *H04L 5/0053* (2013.01);
(Continued)

(58) Field of Classification Search
CPC ... H04W 74/085; H04W 74/00; H04W 74/08; H04W 74/0808; H04W 74/006;
(Continued)

(56) References Cited

U.S. PATENT DOCUMENTS

2011/0103272 A1 5/2011 Dai et al.
2014/0376422 A1 12/2014 Dai et al.
(Continued)

FOREIGN PATENT DOCUMENTS

KR 10-2011-0082485 A 7/2011
WO WO 2015/012665 A1 1/2015

OTHER PUBLICATIONS

Ericsson, "M-PDCCH definition for MTC", R1-156410, 3GPP TSG RAN WG1 Meeting #83, Anaheim, USA, Nov. 15-22, 2015, 3 pages.
(Continued)

*Primary Examiner* — Sudesh M Patidar
(74) *Attorney, Agent, or Firm* — Birch, Stewart, Kolasch & Birch, LLP

(57) ABSTRACT

A method for receiving a downlink signal by a user equipment (UE) in a wireless communication system supporting an unlicensed band, includes monitoring a set of Physical Downlink Control Channel (PDCCH) candidates for receiving a PDCCH in subframe # n−1 of the unlicensed band, wherein n is an integer larger than 1; receiving a first PDCCH in subframe # n of the unlicensed band, wherein the first PDCCH includes information for indicating that a number of occupied symbols in the subframe # n is less than 14; and receiving, from a base station (BS), a second PDCCH including uplink scheduling information in the subframe # n based on that the UE does not receive the PDCCH in the subframe # n−1 and receives the first PDCCH.

12 Claims, 14 Drawing Sheets

Related U.S. Application Data

(60) Provisional application No. 62/319,272, filed on Apr. 6, 2016, provisional application No. 62/314,979, filed on Mar. 29, 2016, provisional application No. 62/294,268, filed on Feb. 11, 2016, provisional application No. 62/287,889, filed on Jan. 27, 2016.

(51) Int. Cl.
  *H04W 74/00* (2009.01)
  *H04W 72/12* (2023.01)
  *H04L 5/00* (2006.01)
  *H04L 27/00* (2006.01)
  *H04W 16/14* (2009.01)
  *H04W 48/16* (2009.01)
  *H04W 72/1268* (2023.01)

(52) U.S. Cl.
  CPC ........ *H04L 5/0078* (2013.01); *H04L 27/0006* (2013.01); *H04W 16/14* (2013.01); *H04W 48/16* (2013.01); *H04W 72/12* (2013.01); *H04W 72/1268* (2013.01); *H04W 72/14* (2013.01); *H04W 74/00* (2013.01); *H04W 74/006* (2013.01); *H04W 74/08* (2013.01); *H04W 74/0808* (2013.01); *H04L 5/001* (2013.01)

(58) Field of Classification Search
  CPC ..... H04W 72/04; H04W 72/14; H04W 72/12; H04W 72/1268; H04W 72/02; H04W 72/042; H04W 72/0446; H04W 72/0493; H04W 72/082; H04W 72/1215; H04W 16/14; H04W 16/06; H04W 48/16; H04W 48/18; H04W 48/20; H04W 74/02; H04W 74/04; H04W 74/0866; H04L 5/0078; H04L 5/0044; H04L 5/001; H04L 27/0006; H04L 5/0053
  See application file for complete search history.

(56) References Cited

U.S. PATENT DOCUMENTS

| | | | |
|---|---|---|---|
| 2016/0057737 A1* | 2/2016 | Kim | H04W 72/1289 370/329 |
| 2016/0278049 A1* | 9/2016 | Nory | H04W 72/042 |
| 2016/0360553 A1* | 12/2016 | Cheng | H04W 74/006 |
| 2017/0027002 A1* | 1/2017 | Yerramalli | H04W 74/004 |
| 2017/0142693 A1* | 5/2017 | Yin | H04W 72/042 |
| 2018/0175975 A1* | 6/2018 | Um | H04W 24/10 |
| 2018/0295649 A1* | 10/2018 | Bhorkar | H04L 5/0048 |
| 2018/0302926 A1* | 10/2018 | Bhorkar | H04W 72/042 |
| 2019/0029045 A1 | 1/2019 | Li et al. | |
| 2019/0230563 A1* | 7/2019 | Jia | H04L 5/001 |

OTHER PUBLICATIONS

Huawei et al., "DL control channel for LAA," 3GPP TSG RAN WG1 Meeting #81, R1-152475, Fukuoka, Japan, May 25-29, 2015, 5 pages.

Intel Corporation, "Extended Subframes and (e)PDCCH for LAA downlink," 3GPP TSG RAN WG1 Meeting #80, R1-150090, Athens, Greece, Feb. 9-13, 2015, pp. 1-7.

Nokia Networks, "On DL transmission detection and UL subframe indication for LAA," 3GPP TSG RAN WG1 Meeting #82bis, R1-155602, Malmö, Sweden, Oct. 5-9, 2015, 6 pages.

Samsung, "Partial subframe for LAA," 3GPP TSG RAN WG1 #82bis, R1-155474, Malmo, Sweden, Oct. 5-9, 2015, pp. 1-6.

ZTE, "Remaining issues on M-PDCCH for MTC enhancement", R1-156664, 3GPP TSG RAN WG1 Meeting #83, Anaheim, US, Nov. 15-22, 2015, 6 pages.

* cited by examiner (a)

(b)

METHOD FOR RECEIVING DOWNLINK SIGNAL, IN WIRELESS COMMUNICATION SYSTEM SUPPORTING UNLICENSED BAND, AND DEVICE FOR SUPPORTING SAME

CROSS-REFERENCE TO RELATED APPLICATIONS

This application is a Continuation of U.S. patent application Ser. No. 16/071,744 filed on Jul. 20, 2018 (now U.S. Pat. No. 10,638,519 issued on Apr. 28, 2020), which is the National Phase of PCT International Application No. PCT/KR2017/000960, filed on Jan. 26, 2017, which claims priority under 35 U.S.C. 119(e) to U.S. Provisional Application No. 62/287,889, filed on Jan. 27, 2016, 62/294,268, filed on Feb. 11, 2016, 62/314,979, filed on Mar. 29, 2016, and 62/319,272, filed on Apr. 6, 2016, all of these applications are hereby expressly incorporated by reference into the present application.

BACKGROUND OF THE INVENTION

Field of the Invention

Following description relates to a wireless communication system supporting an unlicensed band, and more particularly, to a method for a terminal to receive a downlink signal from a base station in a wireless communication system supporting an unlicensed band and apparatuses supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

SUMMARY OF THE INVENTION

An object of the present invention is to provide a method for a UE to receive a downlink signal from a base station when the base station or the UE performs LBT (listen-before-talk) based signal transmission.

In particular, when a UE fails to receive information indicating that an Nth subframe corresponds to a partial subframe (a subframe configuration that a downlink signal is transmitted in a partial symbol only of a subframe) in an N−1th subframe, an object of the present invention is to provide a method for the UE to efficiently receive a downlink signal from the base station.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method for a terminal to receive a downlink signal from a base station in a wireless communication system supporting an unlicensed band and apparatuses supporting the same.

To achieve these and other advantages and in accordance with the purpose of the present invention, as embodied and broadly described, according to one embodiment, a method of receiving a downlink signal, which is received by a user equipment (UE) from a base station in a wireless communication system supporting an unlicensed band, includes the steps of, if a first PDCCH (physical downlink control channel) including information indicating that a downlink signal is not transmitted in a partial symbol of an Nth subframe is not received in an N−1th subframe (where, N is a natural number) and a second PDCCH including information indicating that a downlink signal is not transmitted in a partial symbol of the Nth subframe is received in the Nth subframe, receiving a third PDCCH including uplink scheduling information in the Nth subframe.

To further achieve these and other advantages and in accordance with the purpose of the present invention, according to a different embodiment, a user equipment receiving a downlink signal in a wireless communication system supporting an unlicensed band includes a receiver, and a processor configured to operate in a manner of being connected with the receiver, the processor, if a first PDCCH (physical downlink control channel) including information indicating that a downlink signal is not transmitted in a partial symbol of an Nth subframe is not received in an N−1th subframe (where, N is a natural number) and a second PDCCH including information indicating that a downlink signal is not transmitted in a partial symbol of the Nth subframe is received in the Nth subframe, configured to receive a third PDCCH containing uplink scheduling information in the Nth subframe.

In this case, the third PDCCH can be transmitted via a UE-specific search space.

In this case, the first PDCCH and the second PDCCH may correspond to a common PDCCH.

And, the first PDCCH, the second PDCCH, and the third PDCCH can be transmitted via an unlicensed band.

And, the information indicating that the downlink signal is not transmitted in the partial symbol of the Nth subframe can indicate that the number of symbols occupied in the Nth subframe is less than 14 symbols.

Technical solutions obtainable from the present invention are non-limited the above-mentioned technical solutions. And, other unmentioned technical solutions can be clearly understood from the following description by those having ordinary skill in the technical field to which the present invention pertains.

As is apparent from the above description, the embodiments of the present disclosure have the following effects.

According to the present invention, a base station can provide a UL grant (or UL scheduling information) to a UE via a partial subframe (e.g., a downlink signal not including PDSCH) in a wireless access system supporting an unlicensed band. In other word, when a base station intends to transmit a UL grant (or UL scheduling information) to a UE, the base station can transmit the UL grant (or UL scheduling information) to the UE in a form of a partial subframe to minimize transmission of unnecessary dummy signal.

In response to this, the UE can receive the UL grant (or UL scheduling information) via a partial subframe.

Hence, it is able to more efficiently allocate UL transmission between a base station and a UE in a wireless access system supporting an unlicensed band.

Effects obtainable from the present invention are non-limited by the above mentioned effect. And, other unmentioned effects can be clearly understood from the following description by those having ordinary skill in the technical field to which the present invention pertains. That is, effects which are not intended by the present invention may be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

DETAILED DESCRIPTION OF THE EMBODIMENTS

Figure 1:
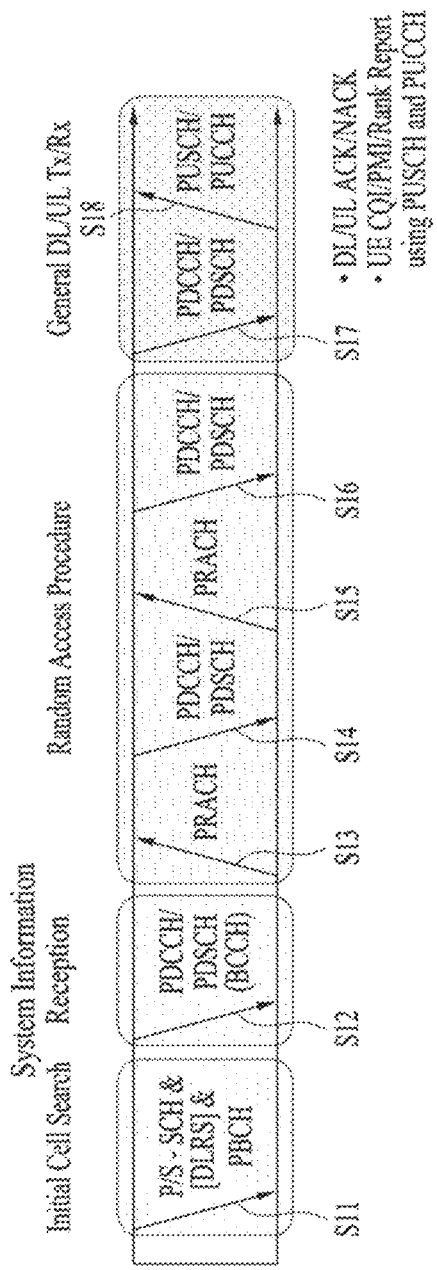
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). ABS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
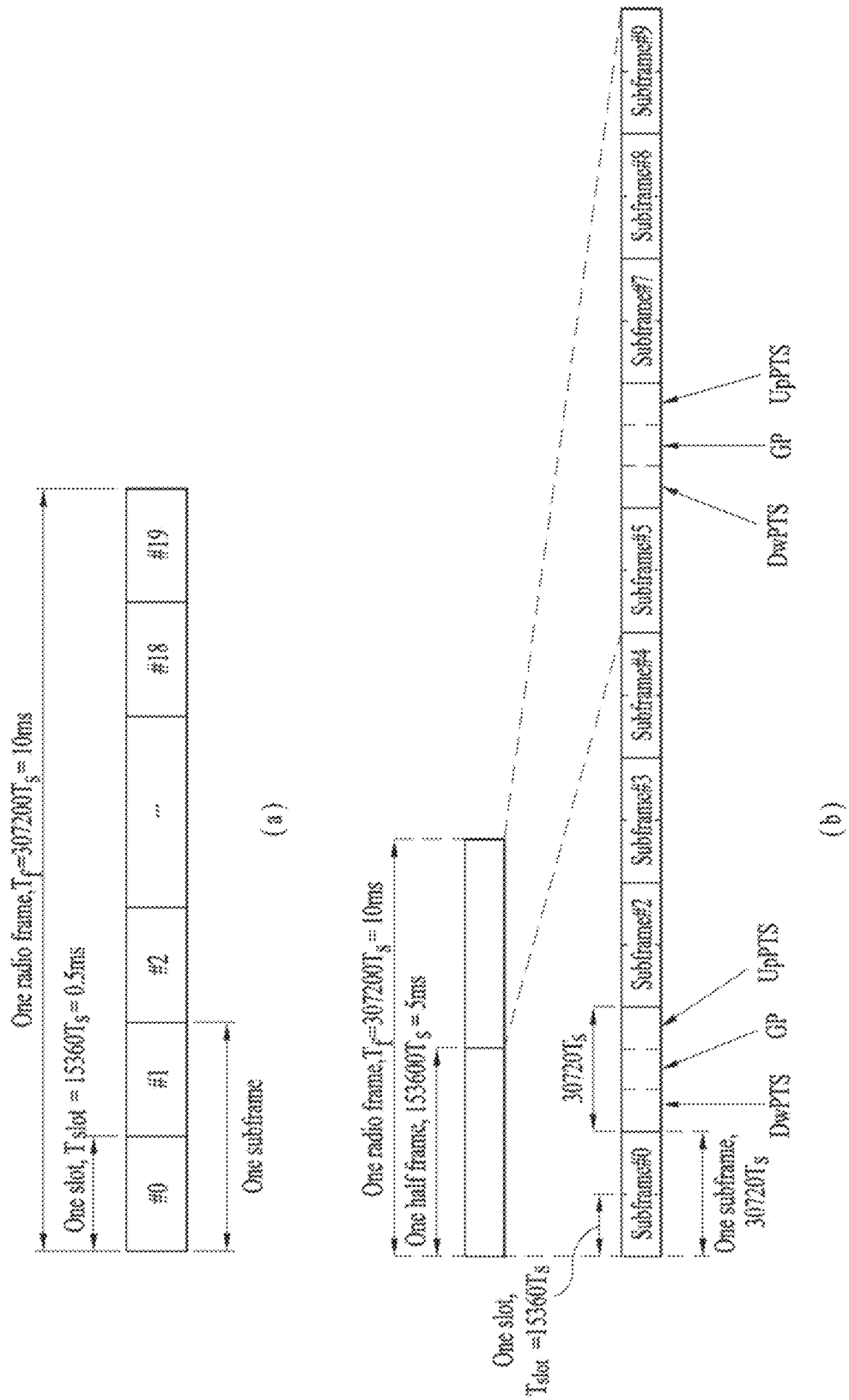
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

RBs of the RB pair occupy different subcarriers in two slots. Thus it is said that the RB pair frequency-hops over a slot boundary.

Figure 5:
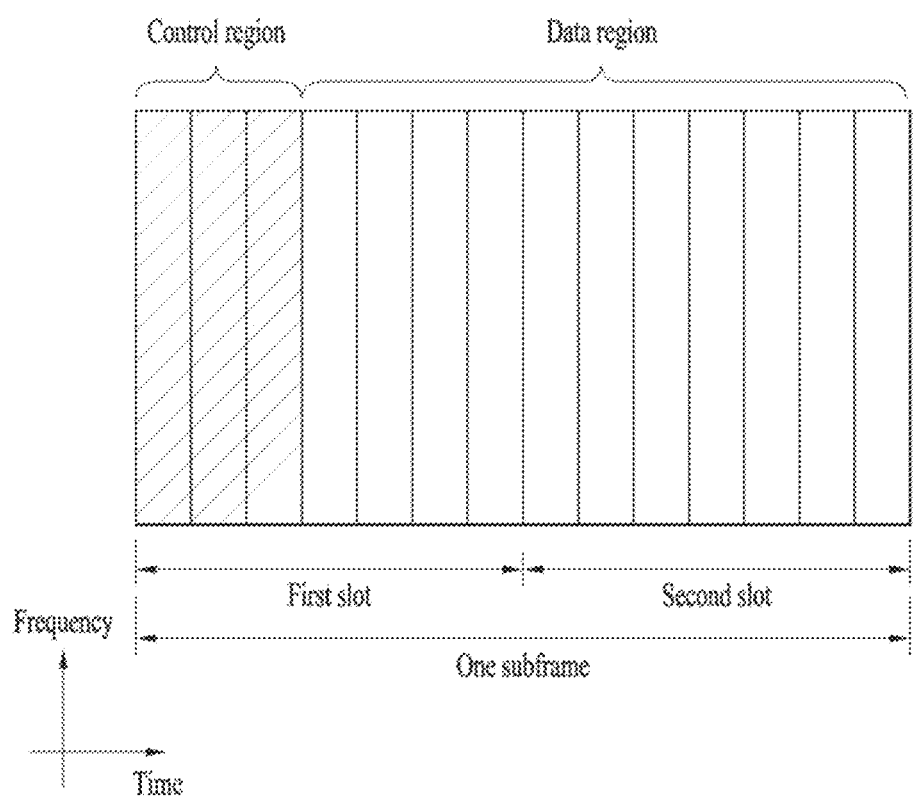
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
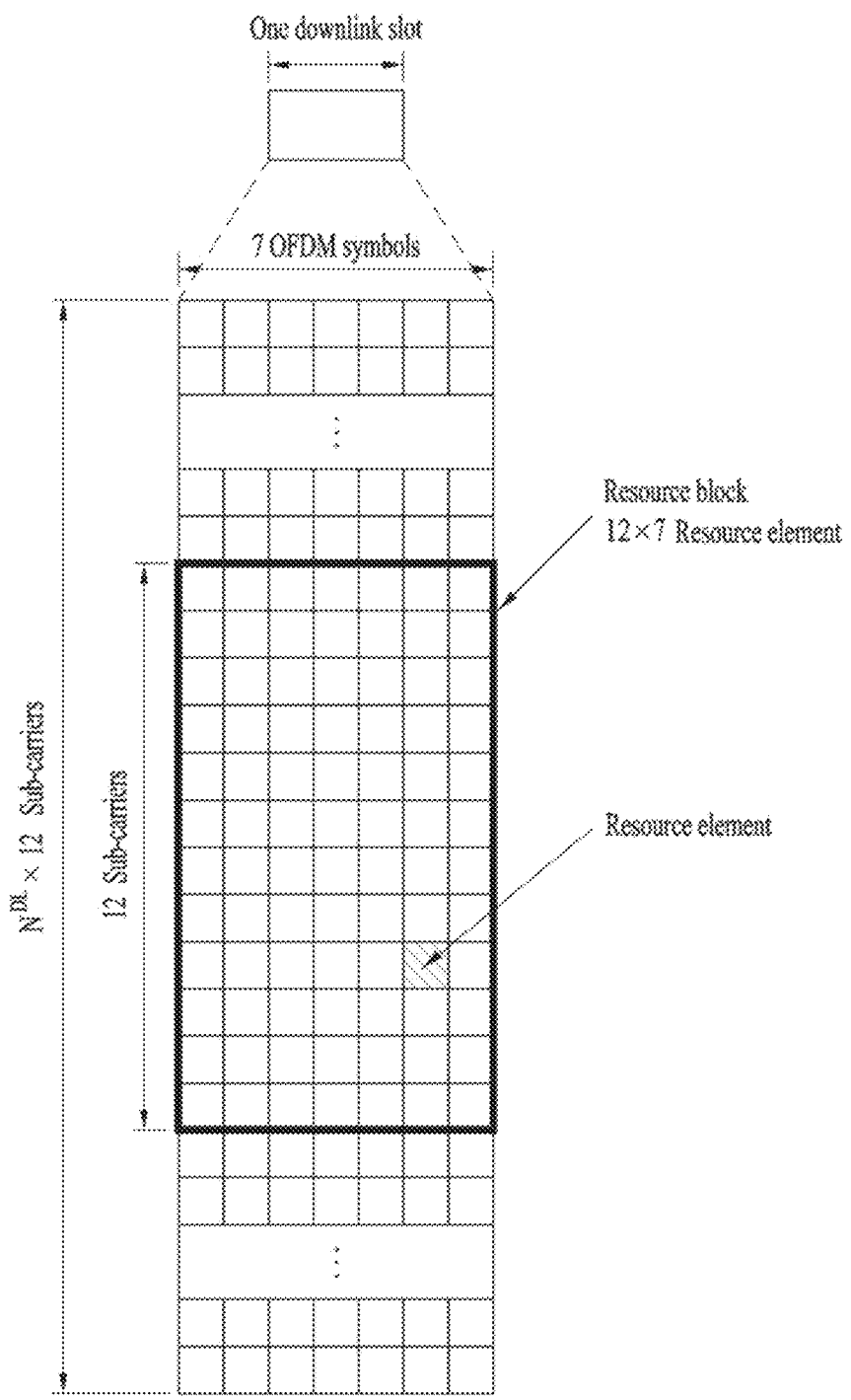
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A structure of an uplink slot may be identical to a structure of a downlink slot.

Figure 4:
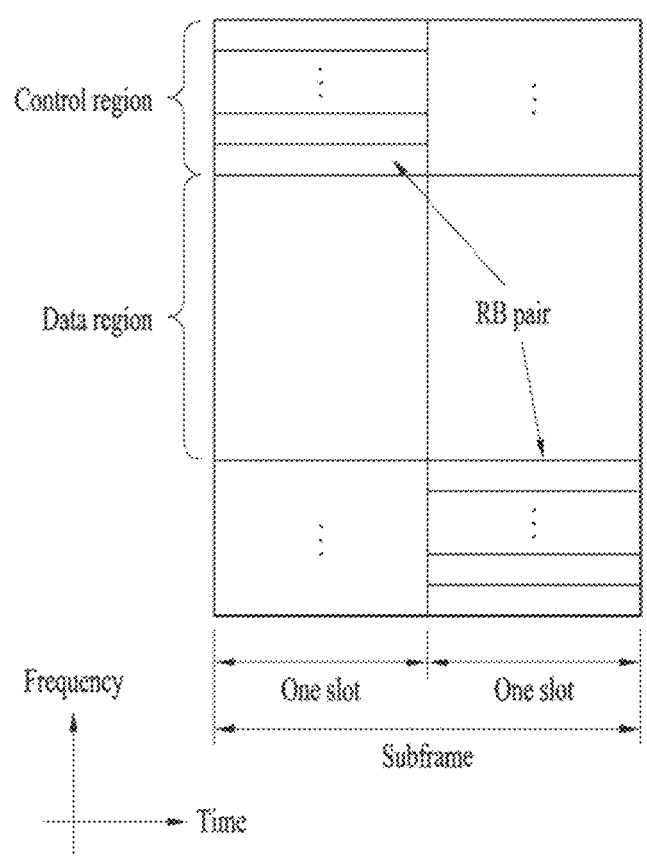
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The 2. LTE-U System 2.1 LTE-U System Configuration Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
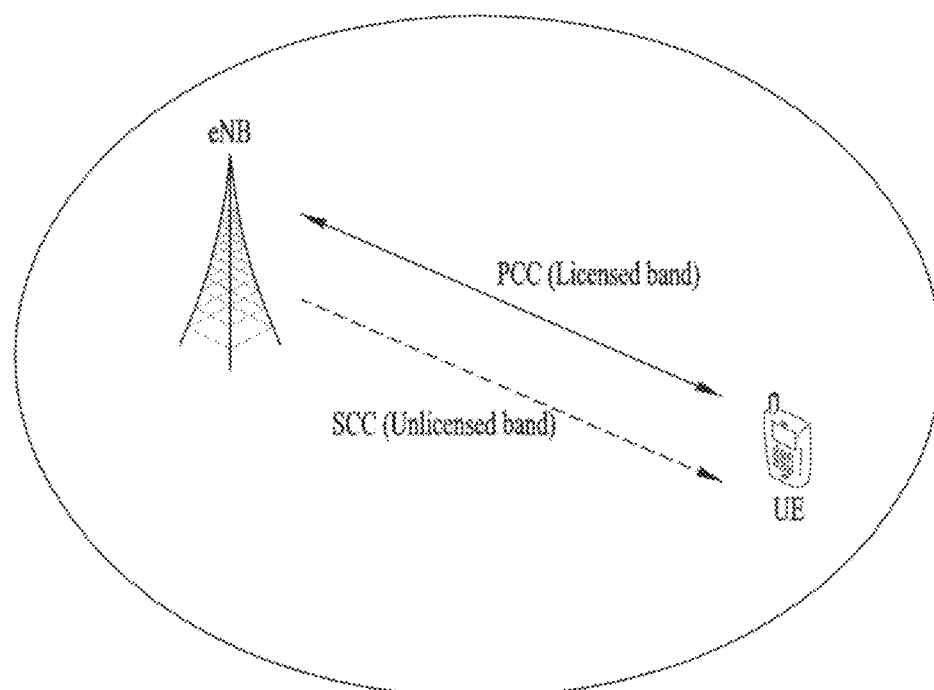
FIG. 6 is a diagram illustrating an exemplary CA environment supported in an LTE-Unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
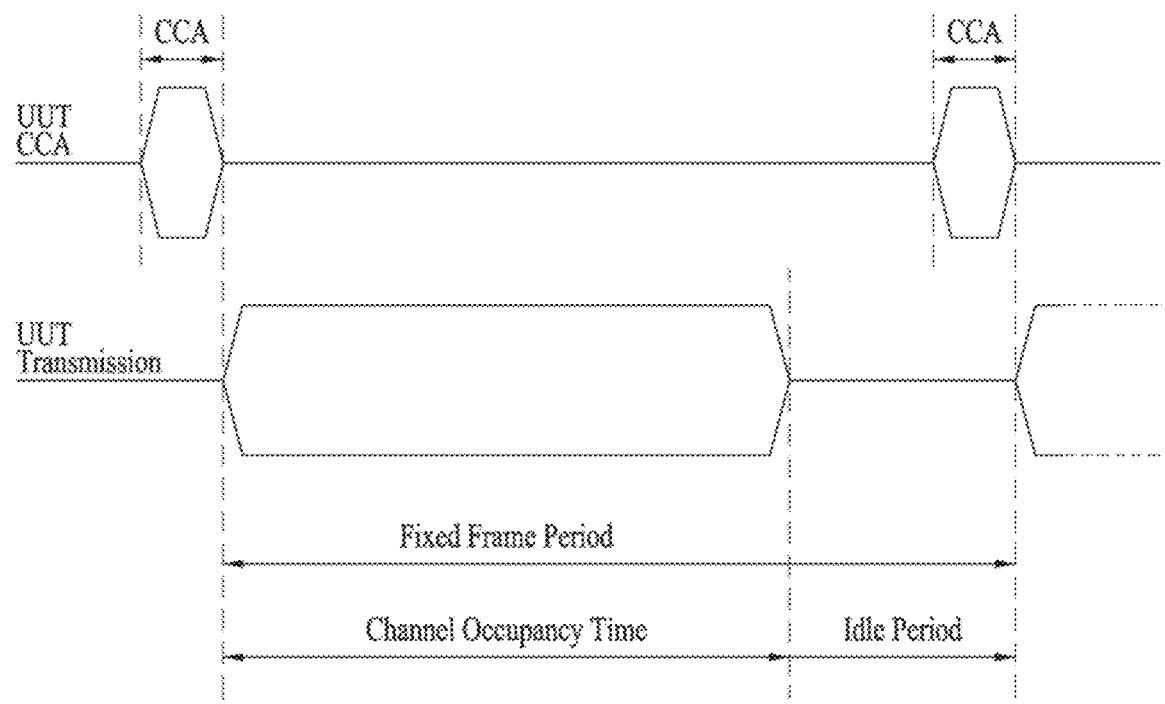
FIG. 7 is a diagram illustrating an exemplary Frame Based Equipment (FBE) operation as one of Listen-Before-Talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 μs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
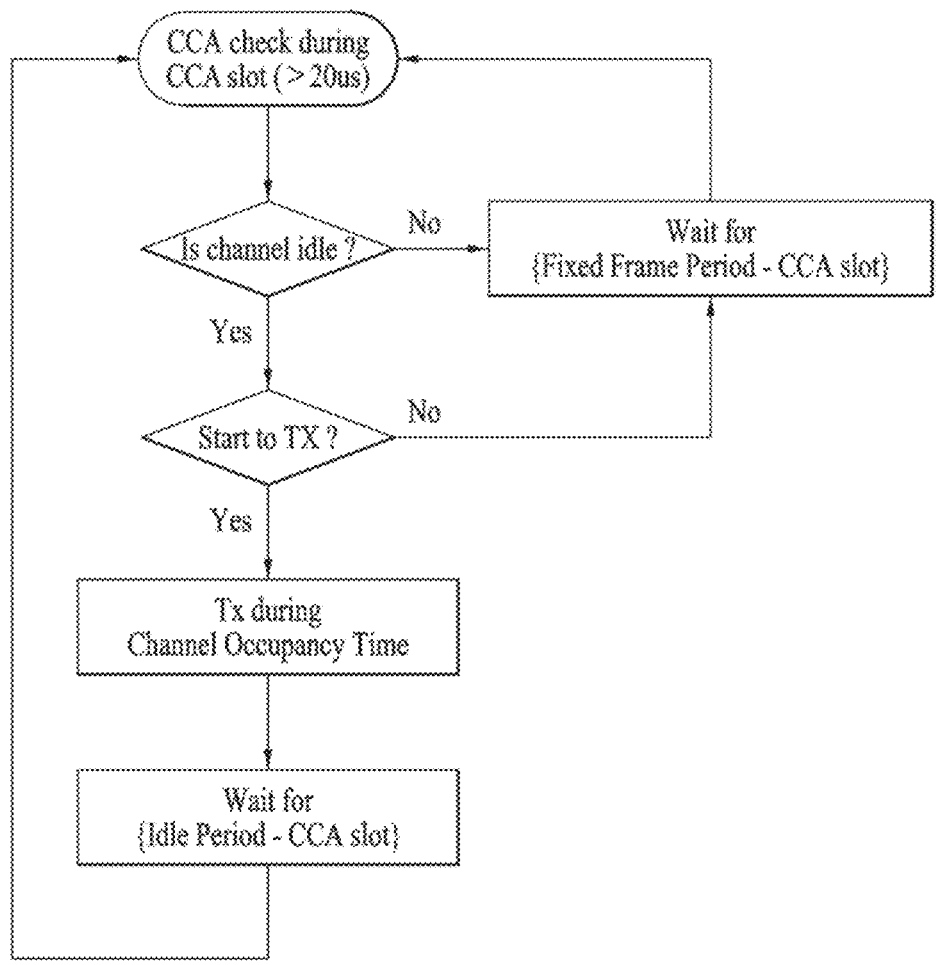
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot. If the channel is idle, the communication node performs data transmission (Tx). If the channel is busy, the communication node waits for a time period calculated by subtracting the CCA slot from a fixed frame period, and then resumes CCA.

The communication node transmits data during the channel occupancy time. Upon completion of the data transmission, the communication node waits for a time period calculated by subtracting the CCA slot from the idle period, and then resumes CCA. If the channel is idle but the communication node has no transmission data, the communication node waits for the time period calculated by subtracting the CCA slot from the fixed frame period, and then resumes CCA.

Figure 9:
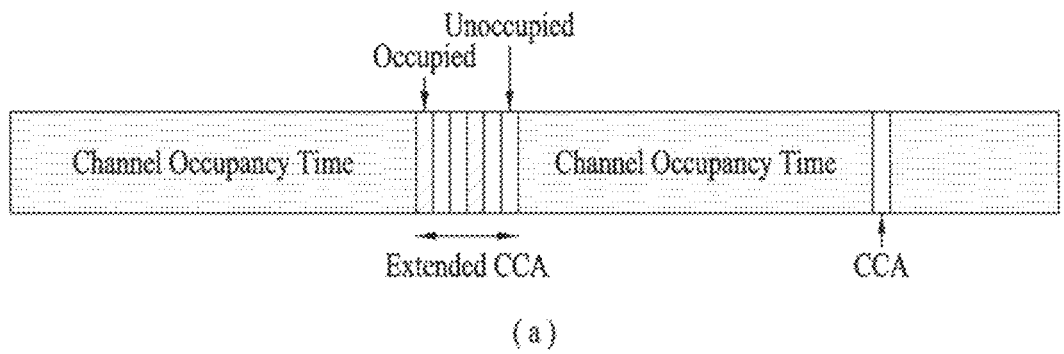
FIG. 9 is a diagram illustrating an exemplary Load Based Equipment (LBE) operation as one of the LBT operations.
Figure 9:
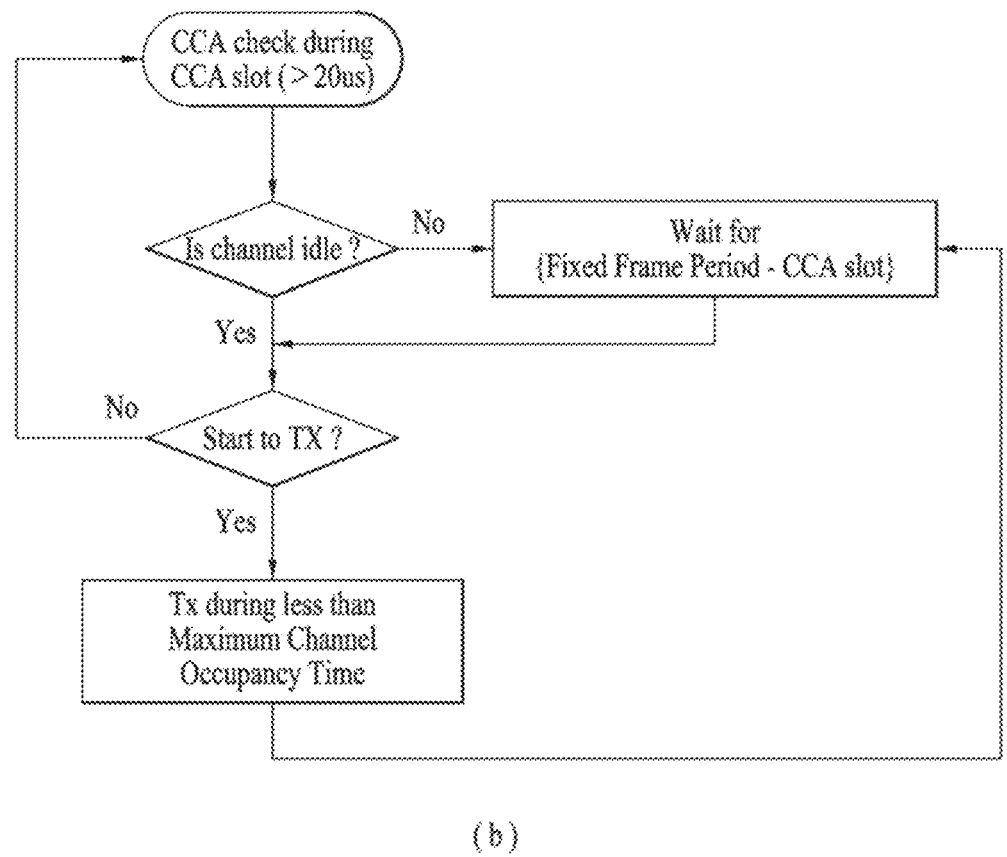

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot. If the channel is unoccupied in a first CCA slot, the communication node may transmit data by securing a time period of up to (13/32)q ms.

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms.

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
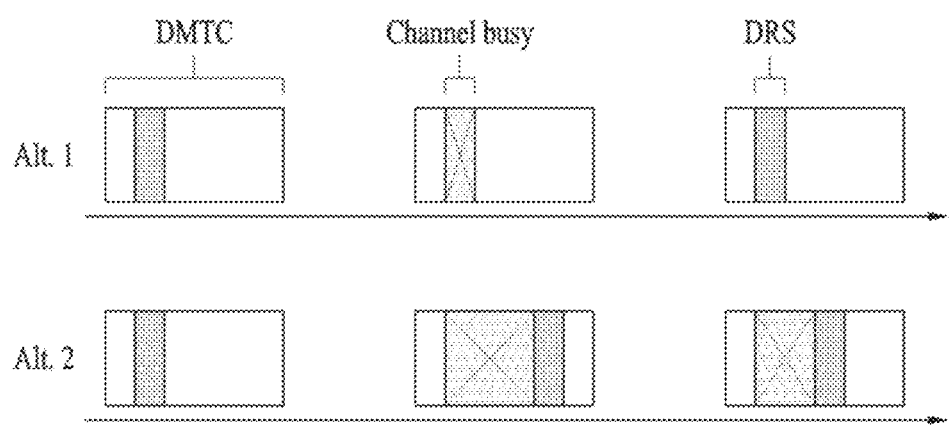
FIG. 10 is a diagram for explaining methods of transmitting a DRS supported in an LAA system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
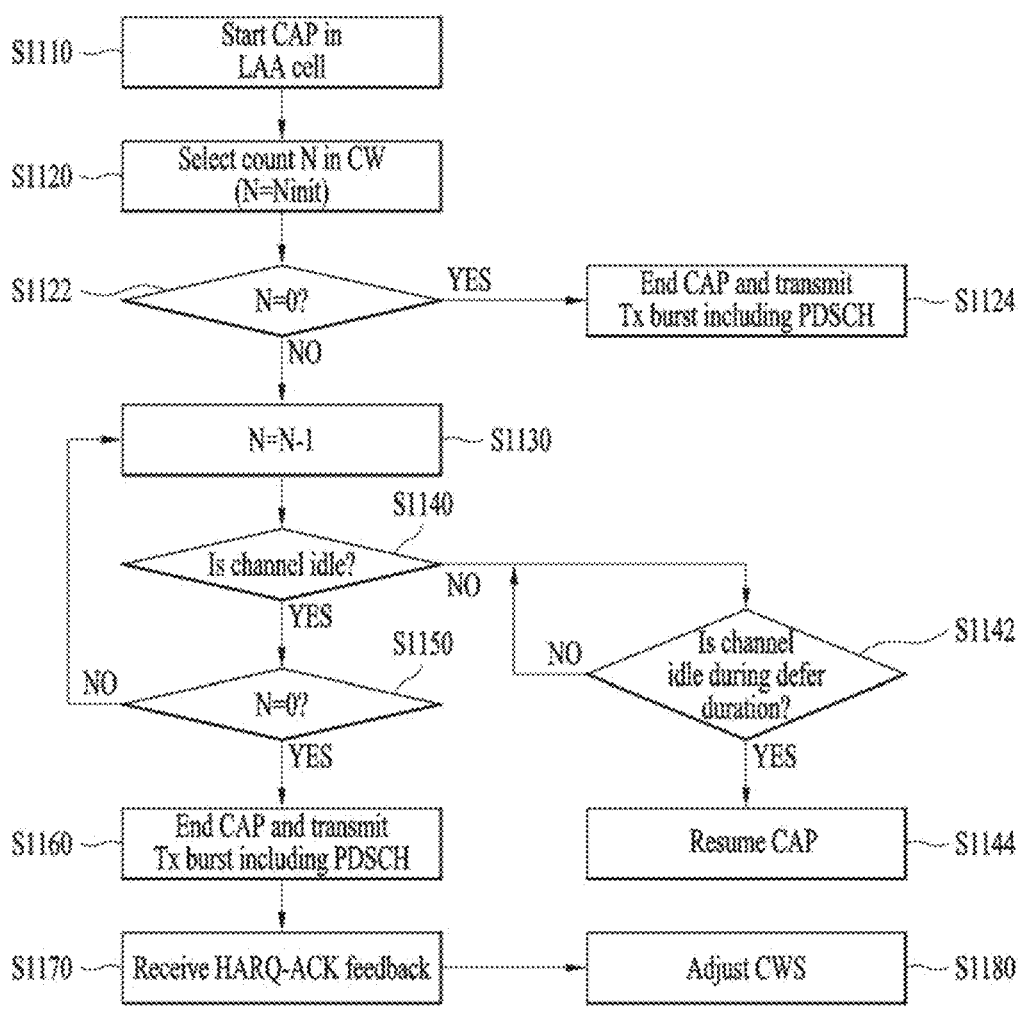
FIG. 11 is a flowchart for explaining CAP and CWA.

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to CWp.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

3. Proposed Embodiment

When a base station or a UE performs LBT (listen-before-talk)-based signal transmission in a wireless communication system consisting of the base station and the UE, the present invention proposes a method of performing DL transmission and configurations applicable to the method.

According to the present invention, a base station or a UE should perform LBT to transmit a signal on an unlicensed band. When the base station or the UE transmits a signal, it is necessary to make signal interference not to be occurred with different communication nodes such as Wi-Fi, and the like. For example, according to Wi-Fi standard, a CCA threshold value is regulated by −62 dBm and −82 dBm for a non-Wi-Fi signal and a Wi-Fi signal, respectively. In particular, if an STA (station) or an AP (access point) senses a signal received with power (or energy) equal to or greater than −62 dBm rather than Wi-Fi, the STA or the AP does not perform signal transmission.

In this case, it may be difficult to always guarantee DL transmission of an eNB or UL transmission of a UE on an unlicensed band. Hence, a UE operating on the unlicensed band may maintain access with a different cell operating on a licensed band to stably control mobility, RRM (radio resource management) function, and the like. In the present invention, for clarity, a cell accessed by a UE on an unlicensed band is referred to as an UScell (or, LAA Scell) and a cell accessed by the UE on a licensed band is referred to as a Pcell. In particular, a scheme of performing data transmission/reception on the unlicensed band using a combination with the licensed band is generally called LAA (licensed assisted access).

TABLE 2

| Channel Access Priority Class (p) | $m_P$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of a channel access priority class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next DL Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

The present invention intends to propose DL transmission methods in LAA system based on the abovementioned contents. Specifically, the present invention proposes a condition for transmitting a UL grant when cross-carrier scheduling from L-cell accompanied with an LBT procedure is performed in LAA Scell, a method of transmitting a UL grant via self-carrier scheduling, a method of defining a reference subframe for adjusting a contention window size (hereinafter, CWS), an operation of adjusting a CWS for a method of performing category 4-based LBT on a specific carrier only among a plurality of carriers, and the like.

3.1 Scheduling Method

Basically, UL transmission can be performed based on scheduling of an eNB in LAA Scell. In particular, the eNB transmits a UL grant (including UL scheduling information) to a UE at the timing of SF # n. Having received the UL scheduling information, the UE transmits UL data at the timing of SF # n+k (e.g., k=4) via an allocated resource. In this case, a scheduling method can be classified into a self-carrier scheduling method and a cross-carrier scheduling method. According to the self-carrier scheduling method, a UL grant is transmitted in LAA Scell in which UL data is transmitted. According to the cross-carrier scheduling method, a UL grant is transmitted in an L-cell (rather than LAA Scell).

3.1.1 Cross-Carrier UL Scheduling from L-Cell with LBT

When an eNB performs cross-carrier UL scheduling in an L-cell, two methods are available.

(1) When an eNB transmits a UL grant in an L-cell, the eNB transmits the UL grant irrespective of a channel state of an LAA Scell and a scheduled UE attempts to transmit UL data after performing LBT for relatively long time.

(2) When an eNB transmit a UL grant in an L-cell, the eNB transmits the UL grant only when a channel is determined as idle after LBT is performed in an LAA Scell. A scheduled UE attempts to transmit UL data after performing LBT for relatively shorter time compared to the method (1).

In this case, according to the method (2), it is necessary not only for an eNB but also for a UE to successfully perform LBT to transmit UL data. Hence, it may be able to configure the UE according to the method (2) to perform LBT for a shorter period of time compared to the UE according to the method (1). By doing so, a UL data transmission probability in the LAA Scell can be similarly adjusted between the two methods.

Figure 12:
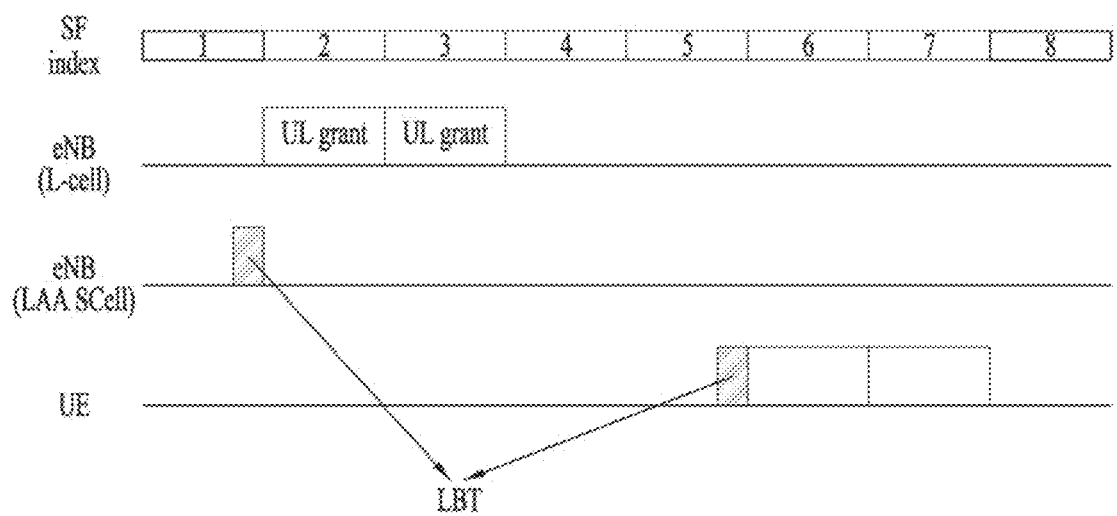
FIG. 12 is a diagram illustrating a cross-carrier UL scheduling method according to the present invention.

FIG. 12 is a diagram illustrating a cross-carrier UL scheduling method according to the present invention.

FIG. 12 illustrates cross-carrier UL scheduling to which the aforementioned method (2) is applied. In order to transmit a UL grant in a second subframe (SF #2) in an Lcell, an eNB performs LBT in an LAA Scell. The eNB can attempt to transmit the UL grant from the SF #2 only when the LBT is successfully completed immediately before the SF #2 starts. If a UL resource scheduled in the SF #2 exists in an SF #6, a UE, which has received the UL grant, can perform LBT prior to the SF #6 (or predetermined timing before and after a subframe boundary) to initiate UL data transmission in the SF #6.

In this case, it is necessary to clearly define a success condition of LBT for transmitting a UL grant transmitted by the eNB in the SF #2. If the eNB successfully performs the LBT prior to a subframe boundary of the SF #2 to transmit the UL grant via self-carrier scheduling in the LAA Scell, the eNB can occupy a channel by transmitting a reservation signal and the like in advance. On the contrary, when the eNB performs LBT in the LAA Scell to perform cross-carrier scheduling in the L-cell, if the eNB transmits a reservation signal based on the LBT which is successfully performed prior to the subframe boundary of the SF #2, since the reservation signal acts as interference only to other nodes, it may not be preferable. However, if the success of the LBT performed by the eNB is restricted to be completed at the timing immediately before the SF #2, it may have a demerit in that a probability of transmitting the UL grant transmitted by the eNB can be lowered compared to the self-carrier scheduling. The present invention proposes an LBT success condition for transmitting a UL grant via cross-carrier scheduling as follows in consideration of the abovementioned contents. [First LBT success condition] If an eNB (or a UE scheduled by the eNB) is transmitting a signal in a subframe prior to a subframe in which a UL grant is transmitted via cross-carrier scheduling in an LAA Scell, the eNB can transmit a UL grant without performing LBT in the LAA Scell. For example, in FIG. 12, if an eNB performs transmission in a first subframe (SF #1) (or during the last symbol of the SF #1) in LAA Scell, the eNB can transmit a UL grant in an SF #2 without any additional LBT.

[Second LBT success condition] When an eNB performs LBT in LAA Scell to transmit a UL grant via cross-carrier scheduling, the eNB can transmit the UL grant only when the LBT is completed at the timing of an SF start boundary at which the UL grant is to be transmitted. Or, the eNB can transmit a UL grant only when LBT is completed at the timing of a second slot boundary of a subframe immediately before a subframe in which the UL grant is to be transmitted.

In this case, it may be able to restrict the eNB to perform the LBT only when a signal is not transmitted in the LAA Scell at the timing of a subframe immediately before a subframe in which a UL grant is to be transmitted via cross-carrier scheduling. For example, referring to FIG. 12, if a signal is not transmitted in (at least of) the last symbol of an SF #1, the eNB should perform LBT in the LAA Scell.

In this case, the LBT performed in the LAA Scell may correspond to category 4 based LBT or single CCA slot LBT. In case of the category 4 based LBT, the eNB should complete the LBT at the timing of a subframe start boundary (or a second slot boundary of a subframe immediately before a subframe in which the LBT is performed) using self-deferral and the like. In case of the single CCA slot LBT, if the eNB determines that a channel is idle during X us (e.g., 25 us) from timing of a subframe start boundary (or a second slot boundary of a subframe immediately before a subframe in which the LBT is performed), the eNB can complete the LBT.

When a UL grant is transmitted via cross-carrier scheduling, a type of LBT performed in the LAA Scell can be specifically or separately configured. For example, in case of a cross-carrier UL scheduling grant, it may be able to predefine a rule that an eNB performs the single CCA slot LBT. Or, it may be able to define a rule that the eNB performs the category 4 based LBT using a specific CWS(s) (or LBT parameters of a specific channel access priority class).

Or, a type of LBT performed in the LAA Scell can be determined according to a type of multi-channel LBT performed in the LAA Scell. For example, if all carriers of a group of carriers including the LAA Scell apply the category 4 based LBT, an eNB can perform the category 4 based LBT in the LAA Scell. As a different example, if the category 4 based LBT is applied to a specific carrier only among the group of carriers including the LAA Scell, the eNB can perform configured LBT in the LAA Scell.

[Third LBT success condition] When an eNB performs LBT in LAA Scell to transmit a cross-carrier scheduling UL grant, if the LBT is completed within T us (or K symbols (K=3)) from the timing of a start boundary of a subframe in which the UL grant is to be transmitted (or a second slot boundary of a subframe immediately before a subframe in which the UL grant is to be transmitted), the eNB can transmit the UL grant. For example, when K corresponds to 2, if the LBT is completed within two symbols prior to a start subframe boundary of SF #2 (or a second slot boundary of a subframe immediately before a subframe in which the UL grant is to be transmitted), the eNB can transmit the UL grant.

In this case, it may be able to configure the eNB to perform LBT only when an additional signal is not transmitted in the LAA Scell within T us (or within K symbols) from the timing of a start boundary of a subframe prior to a subframe in which a cross-carrier scheduling UL grant is transmitted.

In this case, the LBT performed in the LAA Scell may correspond to category 4 based LBT or single CCA slot LBT. When a UL grant is transmitted via cross-carrier scheduling, a type of LBT performed in the LAA Scell can be specifically or separately configured. For example, in case of a cross-carrier UL scheduling grant, it may be able to predefine a rule that an eNB performs the single CCA slot LBT. Or, it may be able to define a rule that the eNB performs the category 4 based LBT using a specific CWS(s) (or LBT parameters of a specific channel access priority class).

As a different example, a type of LBT performed in the LAA Scell can be determined according to a type of multi-channel LBT performed in the LAA Scell. For example, if all carriers of a group of carriers including the LAA Scell apply the category 4 based LBT, an eNB can perform the category 4 based LBT in the LAA Scell. As a different example, if the category 4 based LBT is applied to a specific carrier only among the group of carriers including the LAA Scell, the eNB can perform configured LBT in the LAA Scell.

In the aforementioned methods, an eNB performs LBT to transmit a UL grant. In this case, the LBT may operate irrespective of LBT for transmitting PDSCH or LBT for transmitting a DRS not including PDSCH.

In the aforementioned methods, if it fails to satisfy a success condition of LBT for transmitting a cross-carrier scheduling grant, it may be able to configure an eNB to apply [first LBT success condition] or fallback to the [first LBT success condition] to make a scheduled UE perform LBT for a relatively long time and then attempt to perform UL data transmission. In this case, in order to make the scheduled UE perform the LBT for a relatively long time, the eNB can signal a bigger CWS value (or a backoff counter value selected based on the bigger CWS value) to the scheduled UE.

3.1.2 UL Grant Transmission Method Via Self-Carrier Scheduling

When an eNB intends to transmit a UL grant via self-scheduling without DL data to be transmitted in LAA Scell, the eNB can transmit a corresponding signal by configuring a partial subframe with (E)PDCCH only without PDSCH by utilizing a DwPTS (downlink pilot time slot) of a length of at least 3 OFDM symbols. In this case, the eNB can perform LBT during a timing gap between the partial subframe and a next subframe to increase a probability of starting UL (or DL) transmission in the next subframe.

In LAA system to which the present invention is applied, it may be able to configure a prescribed time period (i.e., a transmission gap) during which signal transmission is not performed in a part of subframes to enable an eNB or a UE to transmit a signal in contiguous subframes. In this case, for clarity, a subframe to which a transmission gap is set is referred to as a partial subframe. In particular, if a transmission gap is set to symbols located at the forepart of a specific subframe in time domain, it is referred to as a start partial subframe (or initial partial subframe). If a transmission gap is set to symbols located at the latter part of a specific subframe in time domain, it is referred to as an end partial subframe.

However, in the LAA system to which the present invention is applied, if an eNB transmits a signal in an end partial subframe (a subframe of which the last partial symbol is emptied out) only, a UE is unable to intactly (perfectly) receive the subframe or a signal transmitted in the subframe. Specifically, when an SF # n corresponds to an end partial subframe, if a UE fails to receive information indicating that a next subframe corresponds to a partial subframe in an SF # n−1 from an eNB, the UE may not attempt to receive a signal transmitted in the SF # n corresponding to the end partial subframe.

This is because a transmission point of a CRS (cell-specific reference signal)/DMRS (demodulation references signal) transmitted in a partial subframe is different from a transmission point of a CRS/DMRS transmitted in a full subframe (a subframe to which a transmission gap is not set). In particular, this is because, since a channel estimation method and a data processing method are different, it is necessary for a UE to have time for preparing the methods. In other word, in order for an eNB to properly transmit a self-scheduling UL grant to a UE without PDSCH, the eNB should transmit a signal using a full subframe of 1 ms. In the present invention, self-carrier scheduling methods appropriate for the situation above are proposed.

3.1.2.1 First Self-Carrier Scheduling Method

Although an eNB transmits a signal to a UE using an end partial subframe in an SF # n, the UE can be configured to mandatorily receive PDCCH. An operation described in the following is explained with reference to FIG. 13.

Figure 13:
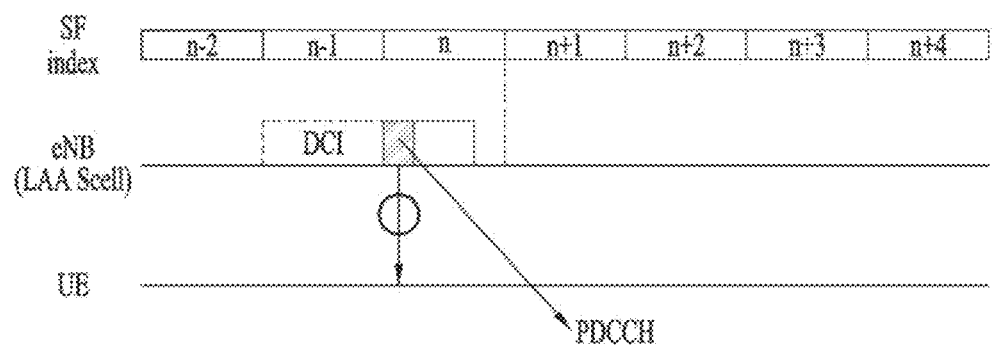
FIG. 13 is a diagram illustrating a UE behavior according to a self-carrier scheduling method in accordance with the present invention.

FIG. 13 is a diagram illustrating a UE behavior according to a self-carrier scheduling method in accordance with the present invention. As shown in FIG. 13, an eNB may not transmit information indicating that a next subframe (i.e., SF # n) corresponds to a partial subframe to a UE in an SF # n−1. Or, although the eNB transmits the information to the UE, the UE may fail to receive the information due to various reasons. The information can be transmitted using DCI (downlink control information). In this case, the present invention proposes a method of configuring the UE to receive PDCCH transmitted in the SF # n all the time.

As a different example, although an eNB transmits a signal to a UE using an initial partial subframe (a subframe of which a first partial symbol is emptied out) in an SF # n−1, the UE can be configured to receive PDCCH transmitted in an SF # n all the time.

In addition, a UE receives PDCCH transmitted from a common search space to identify the number of OFDM symbols constructing the SF # n. Additionally, the UE can also receive PDCCH (i.e., UL scheduling DCI) existing in a UE-specific search space.

Specifically, as shown in FIG. 13, according to the present invention, a UE is unable to receive PDCCH (or DCI) in an SF # n−1. The UE is able to receive PDCCH (or DCI) in an SF # n. In this case, when the UE is unable to receive the PDCCH (or DCI) in the SF # n−1, it includes not only a case that an eNB does not transmit PDCCH (or DCI) in the SF # n−1 but also a case that the UE is unable to receive the PDCCH (or DCI) transmitted by the eNB in the SF # n−1. In this case, the PDCCH can include information indicating that the SF # n corresponds to a partial subframe (a subframe that a DL signal is not transmitted in a part of symbols, e.g., a subframe of which the number of occupied symbols is less than 14).

In this case, according to the present invention, the UE can receive PDCCH including UL scheduling information transmitted in the SF # n. And, the UE can receive information indicating that the SF # n corresponds to a partial subframe in the SF # n. In this case, the UE can receive the PDCCHs on an unlicensed band (LAA Scell).

According to the configuration above, an eNB can also provide a UL grant (or UL scheduling information) to a UE via a partial subframe (e.g., DL signal not including PDSCH). In other word, when the eNB intends to transmit the UL grant (or UL scheduling information) to the UE, the eNB can transmit the UL grant (or UL scheduling information) to the UE in a form of a partial subframe to minimize transmission of unnecessary dummy signal.

3.1.2.2 Second Self-Carrier Scheduling Method

The aforementioned first self-carrier scheduling method has a limit in that the method is applied to a UE scheduled via PDCCH only. For example, when a UE receives EPDCCH (enhanced PDCCH), if information indicating that an SF # n corresponds to an end partial subframe does not exist in an SF # n−1 or if the UE knows that the SF # n corresponds to an end partial subframe while failing to receive the information, since it is difficult for the UE to know a DMRS pattern in the SF # n, it is difficult for the UE to successfully receive EPDCCH in the SF # n corresponding to the end partial subframe.

As a method, it is able to transmit a subframe using a full subframe.

However, it is unable to prepare a timing gap for performing LBT of an eNB or a UE. In order to supplement this, a UE can be configured to monitor PDCCH rather than EPDCCH in an end partial subframe. For example, if a common search space PDCCH or PHICH indicates that a subframe corresponds to a PDCCH monitoring subframe, although a UE is scheduled by EPDCCH, the UE can be configured to receive scheduling DCI via PDCCH rather than EPDCCH in the subframe.

Or, in order for a UE to receive EPDCCH, it is necessary for the UE to know a DMRS pattern. Hence, it may be able to apply a method described in the following to receive EPDCCH in an SF # n corresponding to an end partial subframe.

More specifically, as mentioned earlier in the first self-carrier scheduling method, if the UE becomes aware that the SF # n corresponds to the end partial subframe (via common PDCCH) in the SF # n−1 without the information indicating that the SF # n corresponds to the end partial subframe, a UE behavior can be configured to receive EPDCCH (i.e., UL scheduling DCI) in the SF # n. This is because, in order to decode EPDCCH codeword having a size considerably smaller than a size of PDSCH, although EPDCCH is decoded using a DMRS pattern which is checked by decoding a common PDCCH of a corresponding subframe, it is able to perform UE implementation without any serious problem.

3.1.2.3 Third Self-Carrier Scheduling Method

In order to minimize a transmission count of a subframe configured by a UL grant only without PDSCH, it may allow cross-carrier scheduling to be performed on a different LAA Scell in an LAA Scell or allow multi-carrier scheduling to be performed on a plurality of LAA Scells in an LAA Scell.

It may not allow the aforementioned various self-carrier UL scheduling methods to be performed on an initial partial subframe. In other word, a UE may not expect to receive a UL grant in an initial partial subframe. For more specific explanation, when a UE receives a UL grant in an SF # n via PDCCH, assume that it takes time as much as k ms for the UE to process a series of procedures such as PDCCH processing, timing advance, UL data (e.g., PUSCH/PUCCH/SRS) mapping, and the like. When the UE receives the UL grant via PDCCH of an initial partial subframe of the SF # n, if the UE still transmits UL data in an SF # n+k, the PDCCH of the initial partial subframe of the SF # n is transmitted via OFDM symbol indexes 7 to 9 rather than OFDM symbol indexes 0 to 2, the UE requires less time as much as 0.5 ms compared to a legacy operation. For this reason, it may not allow self-carrier UL scheduling to be performed in an initial partial subframe in consideration of implementation complexity of the UE.

Or, although self-carrier UL scheduling of an initial partial subframe is allowed, a UL grant to PUSCH/PUCCH/SRS transmission delay value can be differently configured depending on whether or not a specific subframe corresponds to a initial partial subframe. For example, if a UE receives a UL grant via PDCCH of an SF # n rather than an initial partial subframe, the UE transmits UL data in an SF # n+k. On the contrary, if a UE receive s UL grant via PDCCH of an SF # n corresponding to an initial partial subframe, the UE can be configured to transmit UL data in an SF # n+k+m (m>0). In this case, a value of the m can be differently configured depending on whether a path on which a UL grant is transmitted corresponds to PDCCH or EPDCCH. For example, if the UL grant is transmitted via EPDCCH, the value of the m is set to 0. If the UL grant is transmitted via EPDCCH, the value of the m can be set to 1.

3.2 LBT Method 3.2.1 Method of Defining Reference Subframe for Adjusting CWS

Basically, CWS adjustment relates to ACK/NACK ratio of DL data. A DL subframe considering HARQ-ACK feedback is defined as a reference subframe for adjusting a CWS. In Rel-13 LAA system, event triggering, which triggers the increase or the decrease of a CWS value, relates to ACK/NACK information of a very first subframe of a DL Tx burst. If more than 80% of HARQ-ACK values of a very first subframe of a recent DL Tx burst are NACK, a CWS is increased. Otherwise, the CWS is reset. In this case, if the first subframe of the DL Tx burst corresponds to an initial partial subframe, it may consider not only ACK/NACK information of the first subframe but also ACK/NACK information of a full subframe appearing immediately after the first subframe.

In Rel-13 LAA system, a reference subframe is defined as follows.

A reference subframe k is the starting subframe of the most recent transmission on the channel made by the eNB, for which HARQ-ACK feedback is available.

In this case, it is necessary to clearly define the meaning of the 'HARQ-ACK feedback is available' in consideration of the following case.

Among the most recent DL Tx burst, when PDSCH transmitted in a first SF # n is different from a PUCCH cell of a UE #2, it may be able to configure a UE #1 to feedback HARQ-ACK at the timing of SF # n+k and configure the UE #2 to feedback HARQ-ACK at the timing of SF # n+k+j. In this case, if an eNB intends to update an LBT parameter between the timing of SF # n+k and the timing of SF # n+k+j, it is not clear whether the eNB or the UE is able to consider the SF # n capable of using a partial HARQ-ACK feedback (i.e., HARQ-ACK feedback of the UE #1) only as a reference subframe.

A first subframe (SF # n) of the most recent DL Tx burst may correspond to a partial subframe and HARQ-ACK feedback on the SF # n can be received in the SF # n+k. In this case, when the eNB intends to update an LBT parameter at the timing of the SF # n+k, the timing of the SF # n+k may correspond to timing at which HARQ-ACK feedback on a second subframe (SF # n+1) of the recent DL Tx burst is not received yet. In this case, it is not clear whether or not the eNB or the UE is able to consider the SF # n and the SF # n+1 as a reference subframe.

In order to solve the ambiguity, the present invention proposes a method of clearly defining a reference subframe as follows.

(1) A subframe can be considered as a reference subframe only when all HARQ-ACK feedbacks are available.

(2) If HARQ-ACK feedback is partly usable, a corresponding subframe is considered as a reference subframe and unusable (non-available) HARQ-ACK feedback may not be utilized for adjusting a CWS.

In addition, it is able to allow HARQ-ACK on a PDSCH to be transmitted in at least one subframe among a plurality of subframes in preparation for a case that HARQ-ACK transmission is introduced on an unlicensed band (U-cell) and HARQ-ACK transmission is not attempted due to the failure of LBT. In this case, it may be necessary to define available HARQ-ACK feedback again.

In this case, HARQ-ACK can be transmitted via PUCCH or can be transmitted in a manner of being piggybacked via PUSCH. For example, HARQ-ACK to be transmitted in an SF # n can be configured by ACK/NACK information on the L number of subframes appearing prior to an SF # n-k. (k and L can be determined in advance or can be configured via physical layer signaling or higher layer signaling). As a different example, HARQ-ACK to be transmitted in the SF # n can be configured by a plurality of HARQ process numbers or HARQ-ACK according to a DAI (downlink assignment index).

Figure 14:
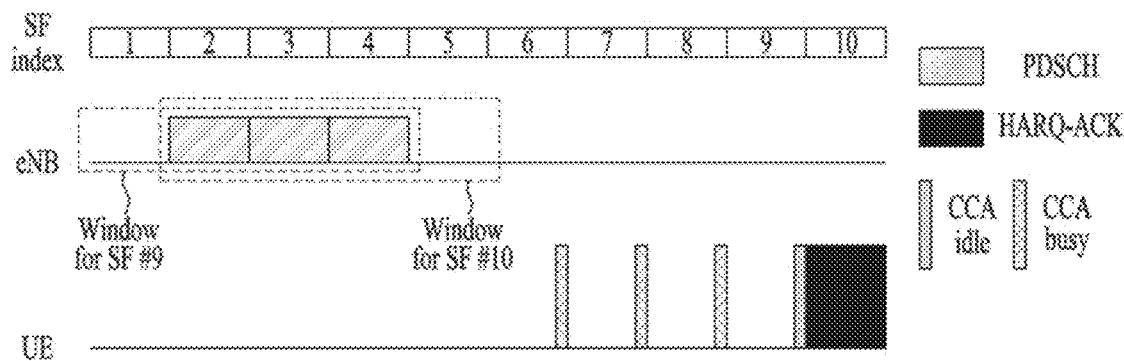
FIG. 14 is a diagram illustrating an operation of configuring HARQ-ACK transmitted in an SF # n by ACK/NACK for 4 previous subframes starting from an SF # n−5.

FIG. 14 is a diagram illustrating an operation of configuring HARQ-ACK transmitted in an SF # n by ACK/NACK for 4 previous subframes starting from an SF # n-5.

As shown in FIG. 14, if an eNB starts to transmit a DL TX burst from an SF #2, HARQ-ACK feedback for a reference subframe of the DL Tx burst can be received in subframes ranging from an SF #7 to an SF #10. In this case, whether or not HARQ-ACK is available is determined by an eNB in every subframe from the SF #7 to the SF #10. If HARQ-ACK feedback on the SF #2 is detected in a subframe from among the 4 subframes, it is able to define that HARQ-ACK for the SF #2 is available at the timing of the subframe. If HARQ-ACK feedback is not detected until the SF #10, the eNB may consider that a UE did not transmit HARQ-ACK or the eNB has failed to detect HARQ-ACK feedback.

3.2.2 Method of Adjusting CWS in Multi-Channel LBT

In Rel-13 LAA system, a multi-channel LBT method is mainly classified into two types. One is to perform category 4 based LBT in all channels belonging to a group carrier (type A) and another is to perform category 4 based LBT in a single channel only among channels belonging to a group carrier (type B). In this case, when the type B multi-channel LBT is performed, a representative carrier on which the category 4 based LBT is performed can be randomly changed in every DL Tx burst or can be changed with a period of 1 second.

Figure 15:
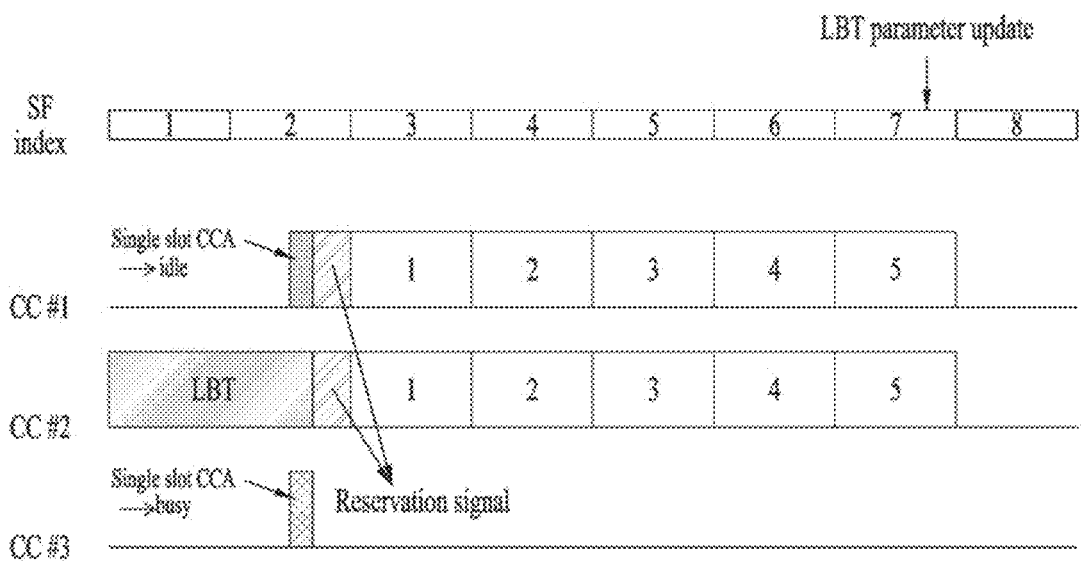
FIG. 15 is a diagram illustrating a multi-channel LBT operation.

FIG. 15 is a diagram illustrating a multi-channel LBT operation.

In FIG. 15, assume that CCs #1 to #3 correspond to a group carrier. In this case, the CC #2 can be configured as a carrier on which category 4 based LBT is performed. In particular, whether or not a channel is idle on the CC #1 and the CC #3 during 25 us is determined on the basis of the timing at which the LBT ends on the CC #2. If it is determined as a channel is idle on the CC #1 only, an eNB attempts to simultaneously transmit a signal on the CC #1 and the CC #2 only and the eNB does not attempt DL transmission on the CC #3.

In FIG. 15, like the timing of SF #7, when DL Tx burst ends and a backoff counter is randomly selected, an eNB or a UE should update an LBT parameter value (e.g., CWS). In this case, as a method of updating the LBT parameter value, it is able to determine whether or not a CWS is adjusted using a reference subframe on all carriers and adjust CWSs of all priority classes of a carrier on which category 4 based LBT is performed. In particular, in FIG. 15, an eNB can adjust a CWS based on ACK/NACK ratio of HARQ-ACK feedback corresponding to PDSCH transmitted on the CC #1 and the CC #2 at the timing of SF #3. When the eNB increases or decreases a CWS based on LBT parameter update, the eNB increase or decreases CWSs of all priority classes of the CC #2 (or a CC on which newly selected category 4 based LBT is to be performed).

However, since a CC on which category 4 based LBT is to be performed is changed in every DL Tx burst, it may not be preferable to update a CWS of a specific CC only. Hence, whether to adjust a CWS is determined using a reference subframe on all carriers, the present invention proposes a method of adjusting not only a CWS of a carrier on which category 4 LBT is performed but also a CWS of all priority classes of all carriers belonging to a carrier group. For example, when an LBT parameter is updated at the timing of SF #7, an eNB or a UE can adjust a CWS value of all carriers. This operation can be restrictively applied to a case that an eNB changes a representative carrier on which category 4 based LBT is performed in every DL Tx burst.

3.2.3 Method of Performing LBT when MCOT is Restricted by Regulation

In Rel-13 LAA system, as shown in Table 1, total 4 channel access priority classes exist and a length of a defer period, a CWS (contention window size), MCOT (maximum channel occupancy time) and the like are determined according to each class. In particular, an eNB performs random backoff using determined parameters according to a channel access priority class and there is a limit on maximum transmission time for which a signal is transmitted by accessing a channel after the random backoff is completed.

In this case, if MCOT longer than time permitted by regulation (e.g., regulation of Japan) is applied, an eNB can be configured to additionally perform CCA during predetermined time (e.g., 34 us) after the time permitted by the regulation.

TABLE 3

For LAA operation in Japan, if the eNB has transmitted a transmission after N = 0 in step 4 of the procedure above, the eNB may transmit the next continuous transmission, for duration of maximum $T_j$ = 4 msec, immediately after sensing the channel for at least a sensing interval of $T_{js}$ = 34 usec, if the power detected by the eNB during $T_{js}$ is less than $X_{Thresh}$, and if the total sensing and transmission time is not more than $1000 \cdot T_{mcot} = \lfloor T_{mcot}/T_j \rfloor \cdot T_{js}$ μsec.

For example, according to the regulation of Japan, if a transmission entity is not permitted to continuously perform transmission more than 4 ms (=T_j) on an unlicensed band, the transmission entity performs CCA during at least 34 us. If it is determined as a channel is idle, the transmission entity can resume transmission. In order for the transmission entity to continuously transmit a signal during 5 ms (=T_mcot), the transmission entity performs transmission during 4 ms, performs CCA during 34 us (=T_js), and transmits the remaining 1 ms. In order for the transmission entity to continuously transmit a signal during 10 ms (=T_mcot), the transmission entity performs transmission during first 4 ms, performs CCA during at least 34 us (=T_js), performs transmission during second 4 ms, performs CCA during at least 34 us (=T_js), and transmits the remaining 2 ms. In particular, as shown in the last sentence of Table 3, the operation above can be permitted during time described in the following equation 1 only.

$$1000 \cdot T_{mcot} + \lfloor T_{mcot}/T_j \rfloor \cdot T_{js} \text{ usec} \quad \text{[Equation 1]}$$

For example, if T_mcot corresponds to 4 ms, time as much as 4 ms (transmission time)+34 us (CCA) is permitted to an eNB according to the equation 1. However, if T_mcot corresponds to 4 ms, since it is able to perform transmission using a single DL Tx burst, it is preferable for the eNB to end signal transmission without CCA.

As a different example, if T_mcot corresponds to 8 ms, time as much as 8 ms (transmission time)+2*34 us (CCA) is permitted to an eNB according to the equation 1. However, if T_mcot corresponds to 8 ms, since it is able to perform transmission using two DL Tx bursts, it is preferable for the eNB to perform CCA one time only. In particular, according to the equation 1, if T_mcot becomes a multiple of T_j, CCA is unnecessarily performed one more time. In order to solve the problem, the present invention proposes equations 2 to 6 instead of the equation 1.

$$1000 \cdot T_{mcot} + \lfloor (T_{mcot}-A)/T_j \rfloor \cdot T_{js} \text{ usec} \quad \text{[Equation 2]}$$

In this case, A should be a value equal to or less than 1 ms. For example, the A may correspond to 1 ms.

$$1000 \cdot T_{mcot} + \lfloor T_{mcot}/T_j - A \rfloor \cdot T_{js} \text{ usec} \quad \text{[Equation 3]}$$

In this case, A may correspond to 0.1 ms.

$$1000 \cdot T_{mcot} + \text{ceiling}((T_{mcot}-A)/T_j) \cdot T_{js} \text{ usec} \quad \text{[Equation 4]}$$

In this case, A should be a value equal to or greater than T_j. For example, the A may correspond to T_j.

$$1000 \cdot T_{mcot} + \text{ceiling}(T_{mcot}/T_j - A) \cdot T_{js} \text{ usec} \quad \text{[Equation 5]}$$

In this case, A may correspond to 1 ms.

$$\begin{cases} 1000 \cdot T_{mcot} + (\lfloor T_{mcot}/T_j \rfloor - 1) \cdot T_{js} u \sec, \text{ if } T_{mcot}/T_j \text{ is integer} \\ 1000 \cdot T_{mcot} + (\lfloor T_{mcot}/T_j \rfloor) \cdot T_{js} u \sec, \text{ otherwise} \end{cases} \quad \text{[Equation 6]}$$

The MCOT configuration method can be identically applied not only to DL transmission but also to UL transmission.

3.2.4 LBT Method for Cooperative Multi-Point (CoMP) Transmission

Similar to LTE system of a legacy licensed band, CoMP (cooperative multi-point) transmission of which a plurality of adjacent cells are cooperate can be applied to DL transmission in an unlicensed band as well. The present invention proposes an LBT method that enables a plurality of TPs (transmission points) to perform DL transmission (e.g., transmission of CRS, CSI-RS, DMRS, PDCCH, PDSCH, etc.) at the same time in the aspect of a random UE.

3.2.4.1 First LBT Method for CoMP Transmission

A method of supporting simultaneous transmission between TPs by aligning LBT parameters (e.g., CWS, backoff counter, backoff slot time boundary, etc.) between TPs is proposed.

For example, a CWS is configured by inter-TP signaling (or a rule predetermined using an SFN (subframe number) and/or a cell ID) and a backoff counter can be configured according to a rule predetermined using an SFN and/or a cell ID. In addition, although a starting value of a backoff counter is the same, it may be able to configure a backoff counter value to be periodically (or dynamically) synchronized between TPs in preparation of a case that a backoff counter value is differently decreased according to a channel status between TPs. And, since slot time boundaries at which backoff is performed are not synchronized due to a defer period or the like, it may be able to configure a slot time boundary to be periodically (or dynamically or by a rule predetermined between TPs) synchronized between TPs.

3.2.4.2 Second LBT Method for CoMP Transmission

When a specific TP performs random backoff-based LBT only among a plurality of TPs, if the remaining TPs determine that a channel is idle during X us (e.g., X=34 us) immediately before the specific TP performing the random backoff-based LBT transmits a signal, the present invention proposes a method that a plurality of the TPs perform simultaneous transmission.

For example, if a backoff counter value of a TP performing random backoff-based LBT becomes 1, corresponding information can be forwarded via signaling between TPs. If it is determined as a channel is idle during time as much as a defer period+one backoff slot time from this timing, all TP may attempt to perform simultaneous transmission. In this case, the TP performing random backoff-based LBT can be changed whenever the LBT ends (by a determined rule or uniformly randomly) and the TP can be configured to be maintained during minimum prescribed time (1 second).

3.2.4.3 Third LBT Method for CoMP Transmission

The present invention proposes a method that one of a plurality of TPs is configured as a master TP and the remaining TPs are configured as slave TPs. According to the present invention, the master TP performs random backoff-based LBT only and the slave TPs do not perform the LBT. The present invention proposes a method that all TPs perform simultaneous transmission when the master TP successfully performs LBT.

In this case, when the master TP succeeds in performing LBT, corresponding information can be signaled to a plurality of the TPS via inter-TP signaling. In this case, the master TP can be changed whenever the LBT ends (by a determined rule or uniformly randomly) and the master TP can be configured to be maintained during minimum prescribed time (1 second).

3.2.4.4 Fourth LBT Method for CoMP Transmission

In the first to the third LBT methods for CoMP transmission, when a TP performs LBT, the present invention proposes a method of configuring the TP to perform CCA in a restricted region of a frequency axis.

For example, it may be able to configure a TP to perform CCA via a specific frequency band (e.g., center 6 RBs) according to a rule predefined among a plurality of TPs and configure the TP not to transmit a signal to the frequency band.

3.2.4.5 Fifth LBT Method for CoMP Transmission

In the first to fourth methods for CoMP transmission, when a TP performs LBT, the present invention proposes a method of configuring the TP to perform CCA after the TP cancels a signal transmitted by a specific TP.

For example, when TPs perform CCA, the TPs preferentially detect a signal predetermined among a plurality of TPs (determined via inter-TP signaling). If the signal is detected, the TPs cancel the signal. If an energy value of the remaining signal is greater than a specific threshold, the TPs determine that a channel is busy. Otherwise, the TPs can determine that the channel is idle.

3.2.5 Method of Defining Maximum Channel Occupancy Time (MCOT)

In Rel-13 LAA system, MCOT is defined as maximum time during which an eNB is able to perform transmission by occupying a channel after the eNB secures the channel. In this case, since Rel-13 LAA system considers DL transmission only, a scheduler is matched with a transmission entity. Hence, it was able to simply define MCOT in the aspect of the eNB. However, in case of Rel-14 enhanced LAA system considering UL transmission as well as DL transmission, it is necessary to newly define MCOT.

Figure 16:
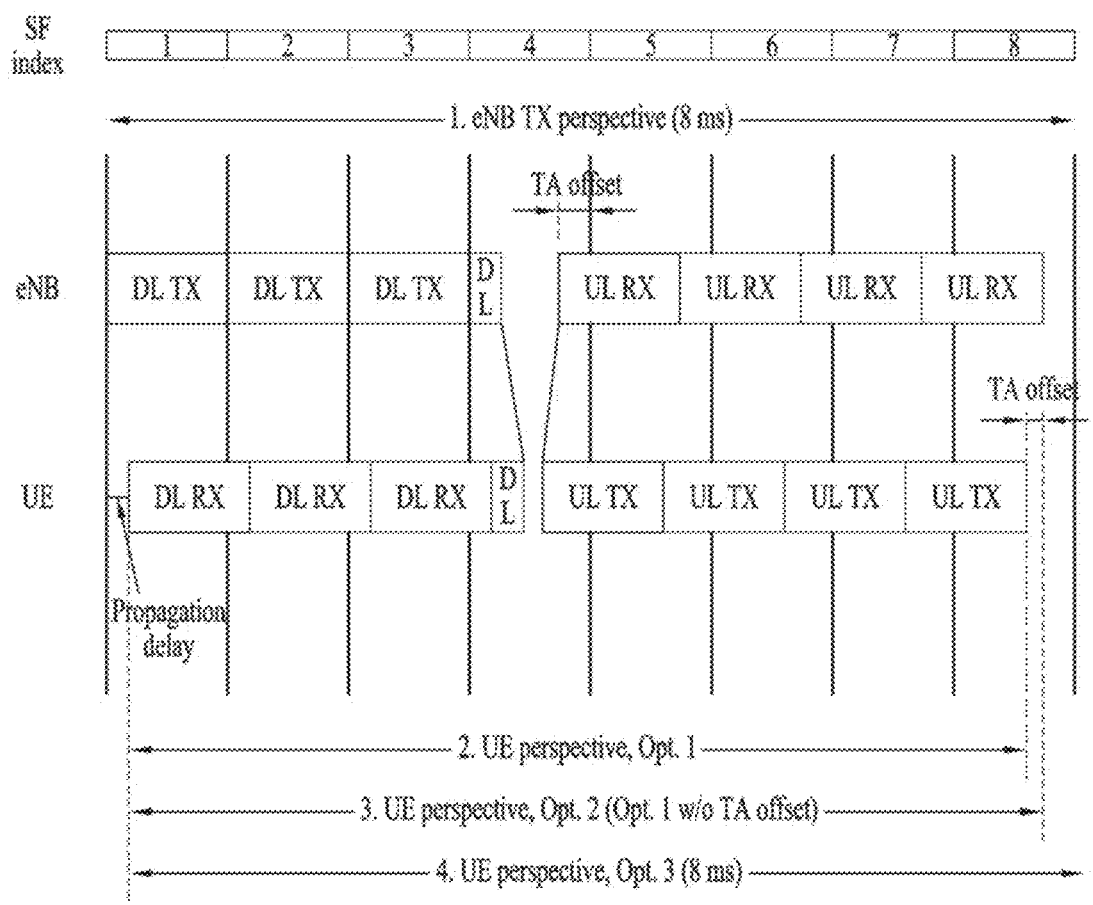
FIG. 16 is a diagram illustrating a method of defining MCOT proposed by the present invention.

FIG. 16 is a diagram illustrating a method of defining MCOT proposed by the present invention.

In FIG. 16, assume that an eNB starts DL transmission at a subframe boundary, transmits a signal in 3 full subframes and 1 DwPTS, and receives UL transmission scheduled by a UE in 4 contiguous subframes. The eNB additionally configures a TA offset to make UL reception timing of the UE precede a subframe boundary as many as k symbols (e.g., k=1, k can be configured via physical layer signaling or higher layer signaling).

According to the proposal, it may allow a UE to perform transmission in MCOT obtained by an eNB after the eNB performs LBT. To this end, the UE can perform LBT which is determined in advance or is configured by signaling (e.g., it may attempt to perform transmission if a channel is idle for prescribed time without random backoff).

3.2.5.1 First Method of Defining MCOT

When MCOT is defined in the aspect of an eNB, the MCOT can be defined by a time period of absolute time (irrespective of whether or not a TA offset is additionally configured) from the timing (including transmission timing of a reservation signal for occupying a channel) at which DL transmission starts by the eNB.

3.2.5.2 Second Method of Defining MCOT

When MCOT is defined in the aspect of a UE, the MCOT can be defined by a time period ranging from the timing at which DL reception of a UE starts (including time for which LBT defined in the MCOT obtained by the eNB is performed) to the timing at which UL transmission ends. In this case, the MCOT may or may not include the time for which LBT defined in the MCOT obtained by the eNB is performed.

3.2.5.3 Third Method of Defining MCOT

Unlike the abovementioned second MCOT definition method, MCOT can be defined in the aspect of a UE irrespective of an additionally configured TA offset. In particular, compared to the second MCOT definition method, the MCOT can be defined by a time period to which time as much as a TA offset is added from the timing at which UL transmission ends.

3.2.5.4 Fourth Method of Defining MCOT

When MCOT is defined in the aspect of a UE, the MCOT can be defined by time including absolute time (e.g., 8 ms) from the timing at which DL reception of a UE starts.

A length of the remaining MCOT can be implicitly or explicitly (e.g., via scheduling DCI or common PDCCH) indicated using the aforementioned MCOT definition method. In this case, the MCOT may correspond to maximum occupancy time obtained by an eNB after LBT is performed.

For example, in FIG. 16, if a length of the remaining MCOT is indicated by M at the timing of SF #4 (or previous timing), MCOT ending timing can be differently interpreted according to the aforementioned MCOT definition method.

According to the first MCOT definition method, the MCOT ending timing may correspond to a boundary of an Mth subframe appearing after the SF #4. According to the second MCOT definition method, the MCOT ending timing may correspond to time appearing after the M number of subframes from the timing at which DL reception of UE starts. According to the third MCOT definition method, the MCOT ending timing may correspond to time as much as the timing at which transmission of the M number of UL subframes ends+TA offset. According to the fourth MCOT definition method, the MCOT ending timing may correspond to timing appearing after an Mth subframe boundary+propagation delay from the SF #4.

3.2.6 LBT for Transmitting Subframe Including UL Scheduling DCI without PDSCH

In LAA Scell, when an eNB intends to schedule a UE to which self-carrier scheduling is set, if the eNB does not have PDSCH to be transmitted, the eNB can transmit a DL subframe consisting of UL grants only without PDSCH (hereinafter, UL grant only SF). When the eNB performs LBT before the UL grant only SF is transmitted, the eNB can perform relatively fast LBT (e.g., LBT of channel access priority class 1, LBT starting transmission when a channel is idle during prescribed time (at least 25 us) only, etc.) By doing so, in case of performing self-scheduling, it may be able to mitigate a penalty such that LBT is to be succeeded not only by a UL transmission UE but also by a scheduling eNB.

However, if LBT (hereinafter, fast LBT) relatively faster than a DL subframe including PDSCH is frequently performed, UL grant only SF can be too frequently transmitted. Then, not only the DL subframe but also a scheduled UL subframe frequently occurs. As a result, a problem may occur in coexisting with a different operator LAA or a different system in an unlicensed band. The present invention proposes a method for solving the problem.

3.2.6.1 First UL Grant Method

When a specific eNB transmits a UL grant only SF using fast LBT, a minimum transmission period (e.g., T ms or K subframes) of the UL grant only SF can be configured. For example, if an eNB transmits a UL grant only SF after fast LBT is successfully performed in an SF # n, the eNB can attempt to transmit UL grant only SF via fast LBT after an SF # n+k.

3.2.6.2 Second UL Grant Method

When a specific eNB transmits a UL grant only SF using fast LBT, a minimum transmission period of the UL grant only SF can be differently configured according to a traffic type of UL data corresponding to a corresponding UL grant. For example, a UL traffic type can be classified into 4 categories and an eNB can identify a category to which UL traffic belongs thereto to be transmitted by each UE via a BSR (buffer status report) received from each of UEs. In this case, it is able to configure a minimum transmission period of a UL grant only SF, which is transmitted using fast LBT, according to a category. (e.g., in case of a category 1, T1 ms or K1 subframes, in case of a category 2, T2 ms or K2 subframes, in case of a category 3, T3 ms or K3 subframes, and in case of a category 4, T4 ms or K4 subframes). In particular, when an eNB transmits a UL grant only SF after fast LBT is successfully performed in an SF # n, if the eNB identifies that UL traffic of a scheduled UE corresponds to the category 1, the eNB may attempt to transmit a UL grant only SF via fast LBT after an SF # n+K1 (or T1 ms).

The aforementioned method can be identically applied not only to transmission of a UL grant only SF using fast LBT but also to a general UL channel or signal. For example, it may be able to define a minimum transmission period of a PRACH (physical random access channel) to which fast LBT is applied, PUCCH (without PUSCH), PUSCH with UCI, or SRS without PUSCH. In this case, the transmission period can be UE-specifically configured or can be configured in the aspect of an eNB scheduler. For example, when the transmission period is configured in the aspect of the eNB scheduler, if there is a UE 1 and a UE 2 associated with a certain eNB and at least one of the UE 1 and the UE 2 transmits PRACH (or PUCCH (without PUSCH), PUSCH with UCI, or SRS without PUSCH) by applying the fast LBT at the timing of an SF # n, both the UE 1 and the UE 2 can attempt to transmit the PRACH (or PUCCH (without PUSCH), PUSCH with UCI, or SRS without PUSCH) via the fast LBT after an SF # n+k. In this case, a minimum transmission period can be differently configured according to a UL channel (via predetermined dynamic signaling or higher layer signaling).

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. It may define a rule that an eNB/location server informs a UE of information on whether to apply the proposed methods (or, information on rules of the proposed methods) via a predefined signal (e.g., physical layer signal or higher layer signal).

4. Device Configuration

Figure 17:
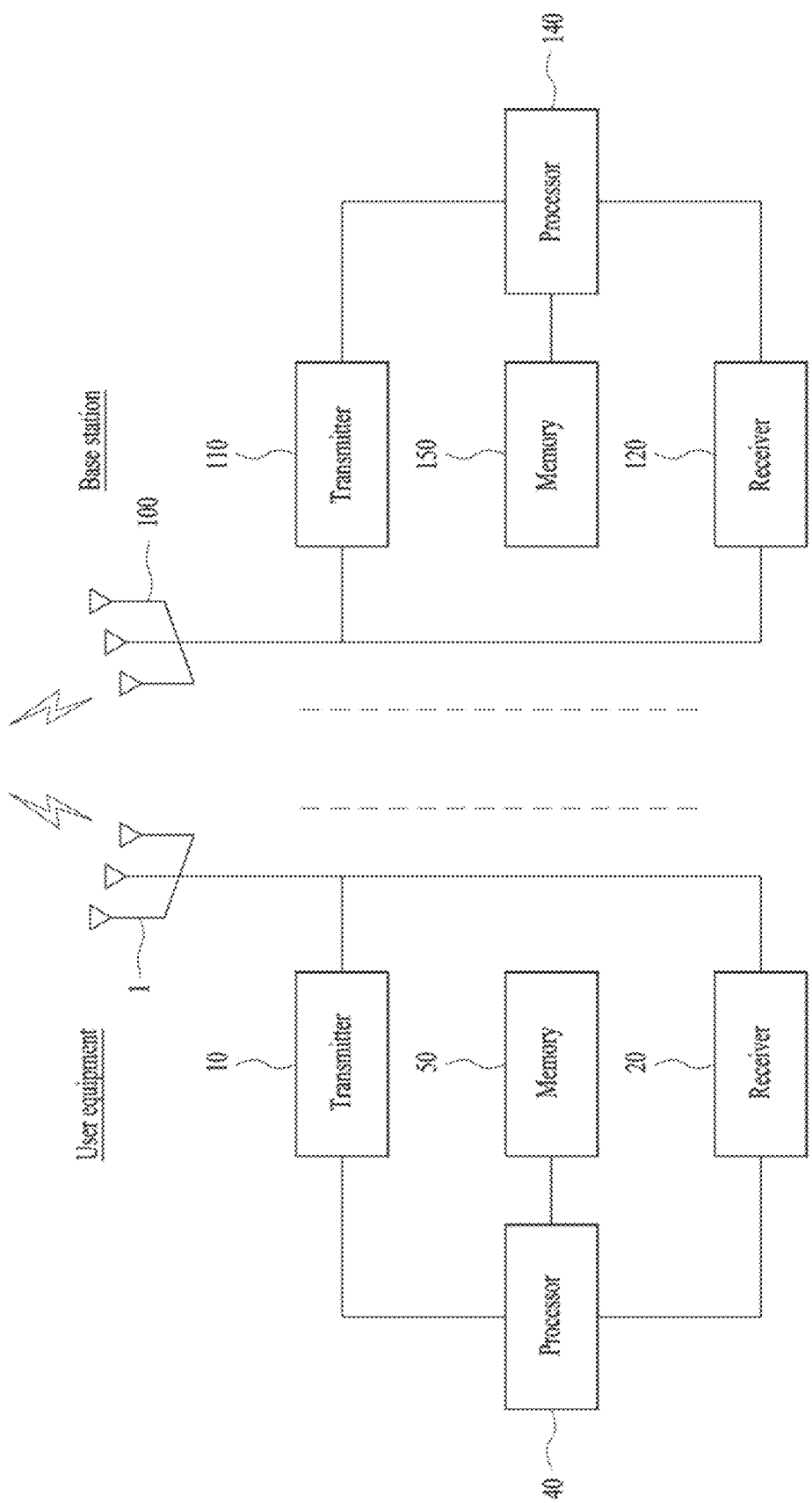
FIG. 17 is diagram illustrating configurations of a UE and a base station in which proposed embodiments are implementable.

FIG. 17 is a diagram illustrating configurations of a UE and a base station capable of being implemented by the embodiments proposed in the present invention. The UE and the base station shown in FIG. 17 operate to implement the embodiments of a method of transmitting and receiving uplink data and a modulation reference signal between the UE and the base station.

A UE 1 may act as a transmission end on a UL and as a reception end on a DL. A base station (eNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE receives first DL control information indicating whether a type of scheduling uplink signal transmission for one or more subframes corresponds to scheduling of a first type or scheduling of a second type from the base station via the processor 40. If the first DL control information indicates the scheduling of the first type, the UE can be configured to transmit an uplink signal in one or more subframes which are configured on the basis of the reception timing of the first DL control information. If the first DL control information indicates the scheduling of the second type, the UE can be configured to receive second DL control information indicating UL signal transmission for one or more subframes from the base station and transmit the uplink signal in one or more subframes which are configured on the basis of the reception timing of the second DL control information.

The base station transmits first DL control information indicating whether a type of scheduling uplink signal transmission for one or more subframes corresponds to scheduling of a first type or scheduling of a second type to the UE via the processor 140. If the first DL control information indicates the scheduling of the first type, the base station can be configured to receive an uplink signal in one or more subframes which are configured on the basis of the reception timing of the first DL control information. If the first DL control information indicates the scheduling of the second type, the base station can be configured to transmit second DL control information indicating UL signal transmission for one or more subframes to the UE and receive the uplink signal in one or more subframes which are configured on the basis of the reception timing of the second DL control information.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 17 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The embodiments of the present invention can be applied to various wireless access systems including 3GPP (3rd Generation Partnership Project) and 3GPP2 system. The embodiments of the present invention can be applied not only to various wireless access systems but also to all technical fields to which the various wireless access systems are applied. Further, the proposed method can also be applied to an mmWave communication system using ultra-high frequency band.

What is claimed is:

1. A method for receiving a downlink signal by a user equipment (UE) in a wireless communication system supporting an unlicensed band, the method comprising:
monitoring a set of Physical Downlink Control Channel (PDCCH) candidates for receiving a PDCCH from a base station (BS) in subframes of a secondary cell configured in the unlicensed band;
receiving, from the BS and in a subframe #n of the secondary cell configured in the unlicensed band, a first PDCCH including information about a number of occupied symbols in the subframe #n being less than 14, wherein n is an integer larger than 1;
based on that the UE receives the first PDCCH in the subframe #n of the secondary cell and does not receive a PDCCH in a previous subframe #n−1 of the secondary cell, receiving, from the BS and in the subframe #n of the secondary cell, a second PDCCH including uplink scheduling information, where the UE is not required to receive a physical downlink shared channel (PDSCH) and any other PDCCHs except the second PDCCH in the subframe #n; and
transmitting, by the UE, an uplink signal based on the uplink scheduling information included in the second PDCCH.

2. The method according to claim 1,
wherein the first PDCCH is received in a common search space of the subframe #n.

3. The method according to claim 1,
wherein the second PDCCH is received in a UE-specific search space of the subframe #n.

4. A method for transmitting a downlink signal by a base station (BS) in a wireless communication system supporting an unlicensed band, the method comprising:
transmitting, to a user equipment (UE), a first Physical Downlink Control Channel (PDCCH) including information about a number of occupied symbols being less than 14 in a subframe #n of a secondary cell configured in the unlicensed band, wherein n is an integer larger than 1;
transmitting, to the UE, a second PDCCH including uplink scheduling information in the subframe #n of the secondary cell; and
receiving, from the UE, an uplink signal based on the uplink scheduling information included in the second PDCCH,
wherein based on that the UE receives the first PDCCH in the subframe #n of the secondary cell and the UE does not receive a PDCCH in a subframe #n−1 of the secondary cell, the uplink signal is transmitted by the UE based on the uplink scheduling information included in the second PDCCH and where the UE is not required to receive a physical downlink shared channel (PDSCH) and any other PDCCHs except the second PDCCH in the subframe #n.

5. The method according to claim 4,
wherein the first PDCCH is transmitted in a common search space of the subframe #n.

6. The method according to claim 4,
wherein the second PDCCH is transmitted in a UE-specific search space of the subframe #n.

7. A user equipment (UE) for receiving a downlink signal in a wireless communication system supporting an unlicensed band, the UE comprising:
a transmitter and a receiver;
a processor; and
a memory coupled operably connectable to the processor and storing instructions that, when executed, cause the processor to perform operations comprising:
monitoring a set of Physical Downlink Control Channel (PDCCH) candidates for receiving a PDCCH from a base station (BS) in subframes of a secondary cell configured in the unlicensed band;
receiving, from the BS and in a subframe #n of the secondary cell configured in the unlicensed band, a first PDCCH including information about a number of occupied symbols in the subframe #n being less than 14, wherein n is an integer larger than 1;
based on that the UE receives the first PDCCH in the subframe #n of the secondary cell and does not receive a PDCCH in a previous subframe #n−1 of the secondary cell, receiving, from the BS and in the subframe #n of the secondary cell, a second PDCCH including uplink scheduling information, where the UE is not required to receive a physical downlink shared channel (PDSCH) and any other PDCCHs except the second PDCCH in the subframe #n; and transmitting, by the UE, an uplink signal based on the uplink scheduling information included in the second PDCCH.

8. The UE according to claim 7, wherein the first PDCCH is received in a common search space of the subframe #n.

9. The UE according to claim 7, wherein the second PDCCH is received in a UE-specific search space of the subframe #n.

10. A base station (BS) for transmitting a downlink signal in a wireless communication system supporting an unlicensed band, the BS comprising:

a transmitter and a receiver;

a processor; and a memory coupled operably connectable to the processor and storing instructions that, when executed, cause the processor to perform operations comprising:

transmitting, to a user equipment (UE), a first Physical Downlink Control Channel (PDCCH) including information about a number of occupied symbols being less than 14 in a subframe #n of a secondary cell configured in the unlicensed band, wherein n is an integer larger than 1;

transmitting, to the UE, a second PDCCH including uplink scheduling information in the subframe #n of the secondary cell; and receiving, from the UE, an uplink signal based on the uplink scheduling information included in the second PDCCH, wherein based on that the UE receives the first PDCCH in the subframe #n of the secondary cell and the UE does not receive a PDCCH in a subframe #n−1 of the secondary cell, the uplink signal is transmitted by the UE based on the uplink scheduling information included in the second PDCCH and where the UE is not required to receive a physical downlink shared channel (PDSCH) and any other PDCCHs except the second PDCCH in the subframe #n.

11. The BS according to claim 10, wherein the first PDCCH is transmitted in a common search space of the subframe #n.

12. The BS according to claim 10, wherein the second PDCCH is transmitted in a UE-specific search space of the subframe #n.

* * * * *